(12) United States Patent
Hull

(10) Patent No.: US 10,028,542 B2
(45) Date of Patent: Jul. 24, 2018

(54) METHOD AND SYSTEM FOR TRACKING GLOVE FAILURE

(71) Applicant: Summit Glove Inc., Minerva, OH (US)

(72) Inventor: James L. Hull, Malvern, OH (US)

(73) Assignee: Summit Glove Inc., Minerva, OH (US)

( * ) Notice: Subject to any disclaimer, the term of this patent is extended or adjusted under 35 U.S.C. 154(b) by 0 days.

(21) Appl. No.: 15/443,507

(22) Filed: Feb. 27, 2017

(65) Prior Publication Data

US 2017/0164669 A1 Jun. 15, 2017

Related U.S. Application Data

(63) Continuation of application No. 15/168,279, filed on May 31, 2016, now Pat. No. 9,635,891, which is a continuation of application No. 13/947,652, filed on Jul. 22, 2013, now Pat. No. 9,380,794.

(51) Int. Cl.
*A41D 19/00* (2006.01)
*A22C 17/00* (2006.01)
*G01D 7/00* (2006.01)

(52) U.S. Cl.
CPC .......... *A41D 19/0082* (2013.01); *A22C 17/00* (2013.01); *G01D 7/00* (2013.01); *A41D 19/00* (2013.01)

(58) Field of Classification Search
CPC .......... G01D 7/00; A22C 17/00; A41D 19/00; A41D 19/0082
USPC ......... 116/200, 201, 209; 2/159, 161, 161.6, 2/161.7, 161.8, 169; 40/625; 235/385, 235/465
See application file for complete search history.

(56) References Cited

U.S. PATENT DOCUMENTS

| | | | |
|---|---|---|---|
| 2,040,137 A | | 5/1934 | Jensen |
| 2,114,022 A | | 1/1935 | Jensen |
| 3,883,898 A | | 5/1975 | Byrnes, Sr. |
| 4,004,295 A | | 1/1977 | Byrnes, Sr. |
| 4,061,709 A | * | 12/1977 | Miller ................ B29C 37/0067 2/168 |
| 4,696,065 A | * | 9/1987 | Elenteny ........... A41D 19/0058 2/164 |
| 4,742,578 A | | 5/1988 | Seid |
| 4,779,289 A | | 10/1988 | Prouty |
| 4,841,653 A | | 6/1989 | Negley |
| 4,864,661 A | | 9/1989 | Gimbel |
| 5,173,966 A | | 12/1992 | DeLeo |
| 5,231,700 A | | 8/1993 | Cutshall |

(Continued)

*Primary Examiner* — R. A. Smith
*Assistant Examiner* — Tania Courson
(74) *Attorney, Agent, or Firm* — Sand & Sebolt

(57) ABSTRACT

A system and method for identifying areas of a processing plant in which a glove is damaged. The system includes utilizing color-coded sets of gloves in different areas or processing steps within the plant. All the gloves used in a particular plant are provided with a unique identifier. If a piece of a glove is located in the product within the plant, the color of that piece indicates the area or process of the plant in which the glove was used. If a piece of a damaged glove is located in the product at a remote destination, the unique identifier in that piece is matched with a registry to determine the plant in which the glove was used. The color of the piece then helps the plant to identify where the damaged glove was used. The system and method are particularly helpful in the food processing industry, especially meat processing.

18 Claims, 3 Drawing Sheets

(56) References Cited

U.S. PATENT DOCUMENTS

| | | |
|---|---|---|
| 5,291,394 A | 3/1994 | Chapman |
| 5,317,760 A | 6/1994 | Best |
| 5,392,320 A | 2/1995 | Chao |
| 5,421,033 A | 6/1995 | DeLeo |
| 5,553,304 A | 9/1996 | Lipner et al. |
| 5,748,478 A * | 5/1998 | Pan ................. G05B 19/41865 700/101 |
| 6,012,170 A | 1/2000 | Kim |
| RE36,778 E | 7/2000 | DeLeo |
| 6,336,053 B1 * | 1/2002 | Beatty ................ G05B 19/4188 700/108 |
| 6,360,373 B1 * | 3/2002 | Rehn ................ A41D 19/0068 15/227 |
| 6,523,045 B1 * | 2/2003 | Beatty .................... G06Q 10/04 |
| 6,551,422 B1 | 4/2003 | O'Connor |
| 6,625,816 B1 | 9/2003 | Cooke |
| 6,643,846 B2 | 11/2003 | Turner-Antonsen |
| 6,697,690 B2 | 2/2004 | Scholl et al. |
| 6,904,370 B1 * | 6/2005 | Levinson ............... G06Q 50/04 702/182 |
| 6,973,675 B2 * | 12/2005 | Cheng ................ A41D 19/0058 2/161.7 |
| 7,079,984 B2 | 7/2006 | Eryurek et al. |
| 7,356,852 B2 | 4/2008 | Thai |
| 8,028,348 B2 | 10/2011 | Hull |
| D652,578 S | 1/2012 | Cummings et al. |
| 8,104,097 B2 * | 1/2012 | Hamann ............ A41D 19/0058 2/159 |
| 8,170,893 B1 | 5/2012 | Rossi |
| 8,365,996 B2 | 2/2013 | Sessums et al. |
| 8,495,764 B2 | 7/2013 | Hull |
| 8,622,015 B1 | 1/2014 | Snyder |
| 2003/0201276 A1 * | 10/2003 | Fuller ................ B65D 83/0805 221/155 |
| 2004/0123370 A1 | 7/2004 | Polesuk |
| 2004/0187189 A1 | 9/2004 | Morita |
| 2005/0028244 A1 | 2/2005 | Roeckl |
| 2005/0060787 A1 * | 3/2005 | Cheng ................ A41D 19/0058 2/161.7 |
| 2005/0160516 A1 | 7/2005 | Price |
| 2006/0020425 A1 | 1/2006 | Chang |
| 2006/0143767 A1 | 7/2006 | Yang et al. |
| 2008/0022919 A1 | 1/2008 | Ohnstad |
| 2008/0162382 A1 | 7/2008 | Clayton et al. |
| 2011/0090050 A1 | 4/2011 | MacFarland |
| 2012/0124714 A1 | 5/2012 | Hamann |
| 2012/0137402 A1 | 6/2012 | Kantrowitz et al. |
| 2012/0227158 A1 | 9/2012 | Ashworth et al. |
| 2013/0067635 A1 | 3/2013 | Lin et al. |
| 2013/0091618 A1 | 4/2013 | Tanaka et al. |
| 2014/0150708 A1 | 6/2014 | Riekie |
| 2015/0136014 A1 | 5/2015 | Peruzzaro |
| 2015/0313298 A1 | 11/2015 | Bailey |
| 2016/0150839 A1 * | 6/2016 | Allen ................ A41D 19/0024 2/161.6 |

* cited by examiner

METHOD AND SYSTEM FOR TRACKING GLOVE FAILURE

CROSS-REFERENCE TO RELATED APPLICATIONS

This application is a Continuation of U.S. patent application Ser. No. 15/168,279 filed May 31, 2016, which is a Continuation of U.S. patent application Ser. No. 13/947,652 filed Jul. 22, 2013, now U.S. Pat. No. 9,380,794, the entire disclosures of which are incorporated herein by reference.

BACKGROUND OF THE INVENTION

Technical Field

This invention relates generally to gloves. More particularly this invention relates to gloves used in the food processing industry. Specifically, this invention relates to a color-coded system for gloves for use in food processing plants, which system aids in the identification of a processing area of a plant in which a glove failure has occurred.

Background Information

Workers who come into direct contact with foodstuffs in food processing facilities are required to wear gloves. Typically these gloves are fabricated from nitrile, latex or some similar material. During use gloves are frequently damaged. The damage may occur through a worker accidentally cutting a glove with a knife or coming into contact with a sharp object, such as a bone in meat processing plants. Additionally, in some food processing operations, contact with the product itself can lead to breakdown in the material used to fabricate the gloves. This occurs in chicken processing plants for example. This breakdown or damage can result in a piece of a glove breaking off the same and being inadvertently incorporated into the product being processed.

Obviously, because the end product is food that is destined for human consumption, it is important that any pieces of gloves that may accidentally find their way into the product are quickly and easily identified and removed therefrom. It is also important from the aspect of running a food processing plant that management be able to quickly and easily identify areas or steps of their process where glove damage occurs most frequently, so that preventative and corrective action in these particular areas or steps of the process may be implemented.

Furthermore, if for some reason a piece of a glove is missed at the food processing plant and makes its way into the end product sold to a consumer, it is important to be able to identify the processing plant where the glove was damaged so that they may be notified of the issue. Obviously, because the piece from the damaged glove is, at this time, at a location remote from where the product was processed, it would be extremely helpful to the food processing plant to somehow be able to identify the area or process in the processing plant where the glove was damaged.

There is therefore a need in the art for a method and system for addressing this issue.

SUMMARY

A system and method for identifying areas of a processing plant in which a glove is damaged is disclosed. The system includes utilizing color-coded sets of gloves in different areas or processing steps within the plant. All the gloves used in a particular plant are provided with a unique identifier. If a piece of a glove is located in the product within the plant, the color of that piece indicates the area or process of the plant in which the glove was used. If a piece of a damaged glove is located in the product at a remote destination, the unique identifier in that piece is matched with a registry to determine the plant in which the glove was used. The color of the piece then helps the plant to identify where the damaged glove was used. The system and method are particularly helpful in the food processing industry, especially meat processing.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

Similar numbers refer to similar parts throughout the drawings.

DETAILED DESCRIPTION

Figure 1:
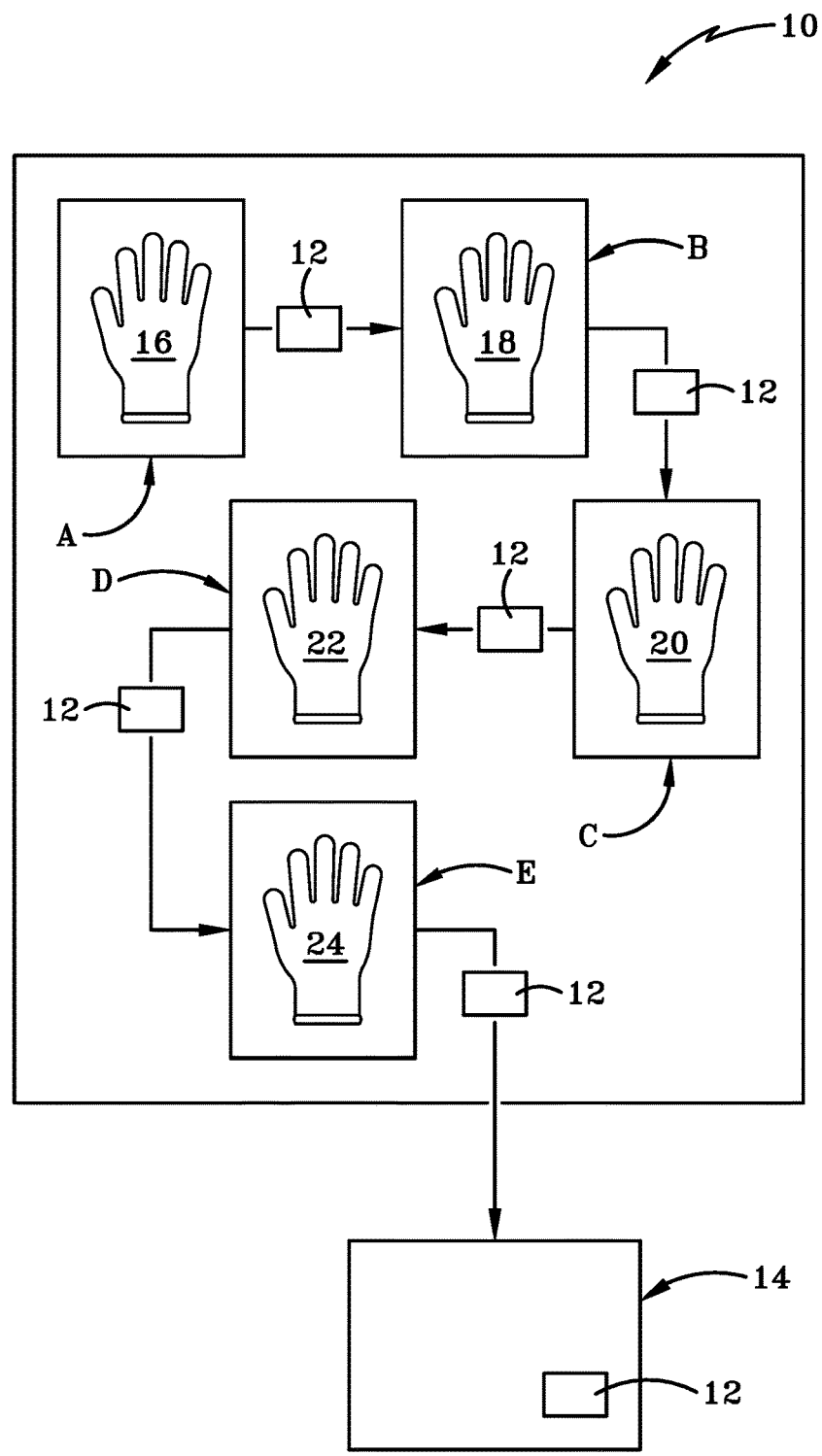
FIG. 1 is a diagrammatic view of a processing operation for a product showing a plant from which a product originates and a destination location to which the product is ultimately shipped.

In FIG. 1 there is shown, in diagrammatic form, a processing plant, generally indicated by the reference number 10. Processing plant 10 includes a plurality of areas therein, identified by the reference characters "A", "B", "C", "D", and "E". The reference areas A-E should be understood to represent different locations/stations in the plant 10 or represent different processing operations/steps in the production of a product 12. For the purposes of this description only, Areas A-E shown in FIG. 1 identify different processing operations or steps in the processing of a product 12. Thus, these operations are linked together by arrows which indicate the flow of product 12 as it is processed through the plant 10.

Plant 10 is contemplated to be any plant that processes foodstuffs and includes but is not limited to processing of raw foods such as vegetables, fruit and meats. Plant 10 is more particularly contemplated to be a plant that processes raw meat. One of the raw meat processing plants in which gloves frequently become damaged through contact with the product is in the processing of raw poultry. Thus, for the purposes of this description, plant 10 may be considered to be a poultry processing facility.

FIG. 1 also illustrates a destination location 14, such as a store, that is remote from plant 10 and to which the processed end product 12 is ultimately shipped and then sold to a consumer. Destination location 14, however, can alternatively represent an intermediate location where product 12 is further processed before being shipped to a facility where the consumer may purchase or consume the same.

Figure 2:
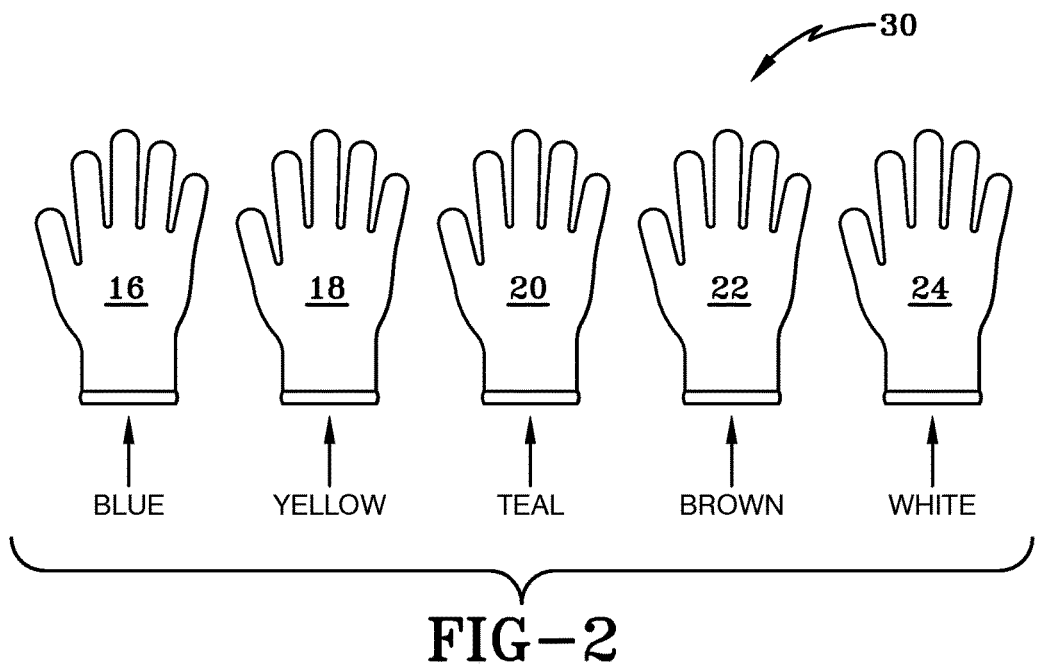
FIG. 2 is a diagrammatic view of a sample set of gloves that are utilized at the processing plant.

A method and system of identifying which area or processing operation in plant 10 a glove failure has occurred is disclosed herein. The system 30 (FIG. 2) comprises a plurality of sets of gloves 16, 18, 20, 22, 24 which are used in plant 10. It will be understood that a single glove of each category 16-24 is illustrated in FIG. 2 but this single glove is representative of a particular characteristic of the set of gloves used in each of the various areas A-E of plant 10. Gloves 16-24 are fabricated from latex or nitrile or any other suitable material that is approved for use for in the processing of foodstuffs by the US Food and Drug Administration (FDA).

Gloves 16-24 are each fabricated in a different color. Plant 10 will have a particular color code as it relates to the use of gloves in specific areas of the plant. In particular, at plant 10 the management will assign a first glove 16 of a first color to Area A, assign a second glove 18 of a second color to Area B, assign a third glove 20 of a third color to Area C, assign a fourth glove 22 of a fourth color to Area D, and assign a fifth glove 24 of a fifth color to Area E. The color of all of the gloves assigned for use in any one of the specific areas A-E (i.e., locations or processing steps) in plant 10 will all be the same. This makes it possible to identify which area A-E a glove is from simply by looking at its color. So, for example, as shown in FIGS. 1 and 2, the gloves 16 are used in Area A and are of a first color, the gloves 18 are used in Area B and are of a second color, the gloves 20 are used in Area C and are of a third color, the gloves 22 are used in Area D and are of a fourth color, and the gloves 24 are used in Area E are of a fifth color. In plant 10 shown in FIG. 1, by way of example only, gloves 16 used in area A are blue, gloves 18 used in area B are yellow, gloves 20 used in area C are teal, gloves 22 used in area D are brown, and gloves 24 used in area E are white. It will be understood that the gloves 16-24 and the colors selected for gloves 16-24 are contemplated to be gloves and colors approved for use in food processing by the FDA.

It will further be understood that if there are fewer areas in a plant than areas A-E, then a same number of differently colored sets of gloves will be utilized in that plant. (So, if a process only has three steps, then three differently colored sets of gloves will be used in the plant.) If there are more areas in a plant than areas A-E, then a same number of differently colored sets of gloves will be utilized in that plant. (So, if there are eight stations in a plant where food is processed, then eight differently colored sets of gloves will be used in the plant.) The number of differently colored sets of gloves will therefore correlate with the number of areas in the process or plant that need to be monitored.

Preferably, the colors selected will be ones that are readily and easily visible relative to the product being processed. So, for example, if beef is being processed, brown gloves will preferably be avoided as they do not stand out sufficiently relative to the color of the meat. However, colors such as yellow, white or teal would help any pieces of glove that have become detached and found their way into the meat to be easily spotted. So, for example if product 12 is inspected shortly before leaving plant 10 and a piece of teal glove is located in product 12, then it would be immediately obvious that the piece of glove located came from area C, as that is where all gloves 18 are teal in color. If the piece of glove was white, then it would be immediately obvious that the piece of glove originated in area E as that is where all gloves 24 are white in color.

Gloves 16-24 may also have other characteristics that can set them apart. For example, in chicken processing, it is advantageous to have a textured outer surface that enables the product to be more easily gripped. So, it is possible in one plant for two sets of similarly colored gloves to be utilized if the textures on their exterior surfaces differ. Similarly, in some instances it is advantageous to have flocking on the interior surface of the gloves. Thus, two similarly colored sets of gloves can be utilized in a plant if one set has flocking on the interior surface and the other set lacks that flocking.

Gloves 16-24 preferably are also provided with a unique identifier 26 (FIG. 3) thereon that indicates the particular plant in which gloves 16-24 are used. All of gloves 16-24 used in plant 10 will be provided with the same unique identifier. This is desirable because more than one plant may supply the same type of product 12 to destination location 14. (For instance, a grocery chain may source chicken from four or five poultry suppliers.) Thus, the identifier 26 used by one plant 10 must differ from the identifiers used by all other plants that process the same foodstuff. The identifier 26 may take any one of a variety of different formats and may be included in the material from which the gloves is fabricated or may be applied onto either of the interior or exterior surfaces of the glove. The format selected will be one that enables a store (14), for example, to identify the particular plant in which a particular glove was used if a piece of glove is located in product 12. Identifier 26 may be any distinguishing feature. Thus, identifier 26 can be a particular shade or tone of a color that is fabricated specifically for a plant 10. Identifier 26 can be a name or trademark applied to a surface of the glove. Still further, identifier 26 can be a number or symbol that is provided on glove 16-24 which is able to be compared to a list or registry of plants which process that type of foodstuff. Identifier 26 can even be some type of chemical, electronic or digital signature. Any suitable identification means safe for handling foodstuffs is contemplated for use as an identifier 26. Preferably, identifier 26 is provided or applied over the entire glove including finger regions, palm region and thumb region. However, if in particular operations it is found that mainly the finger regions and palm region, for example, are typically damaged while the rest of the glove it typically left intact, then it is possible that identifier 26 will only be applied to those more vulnerable regions of the glove and the rest of the glove will be free of identifiers.

Figure 4:
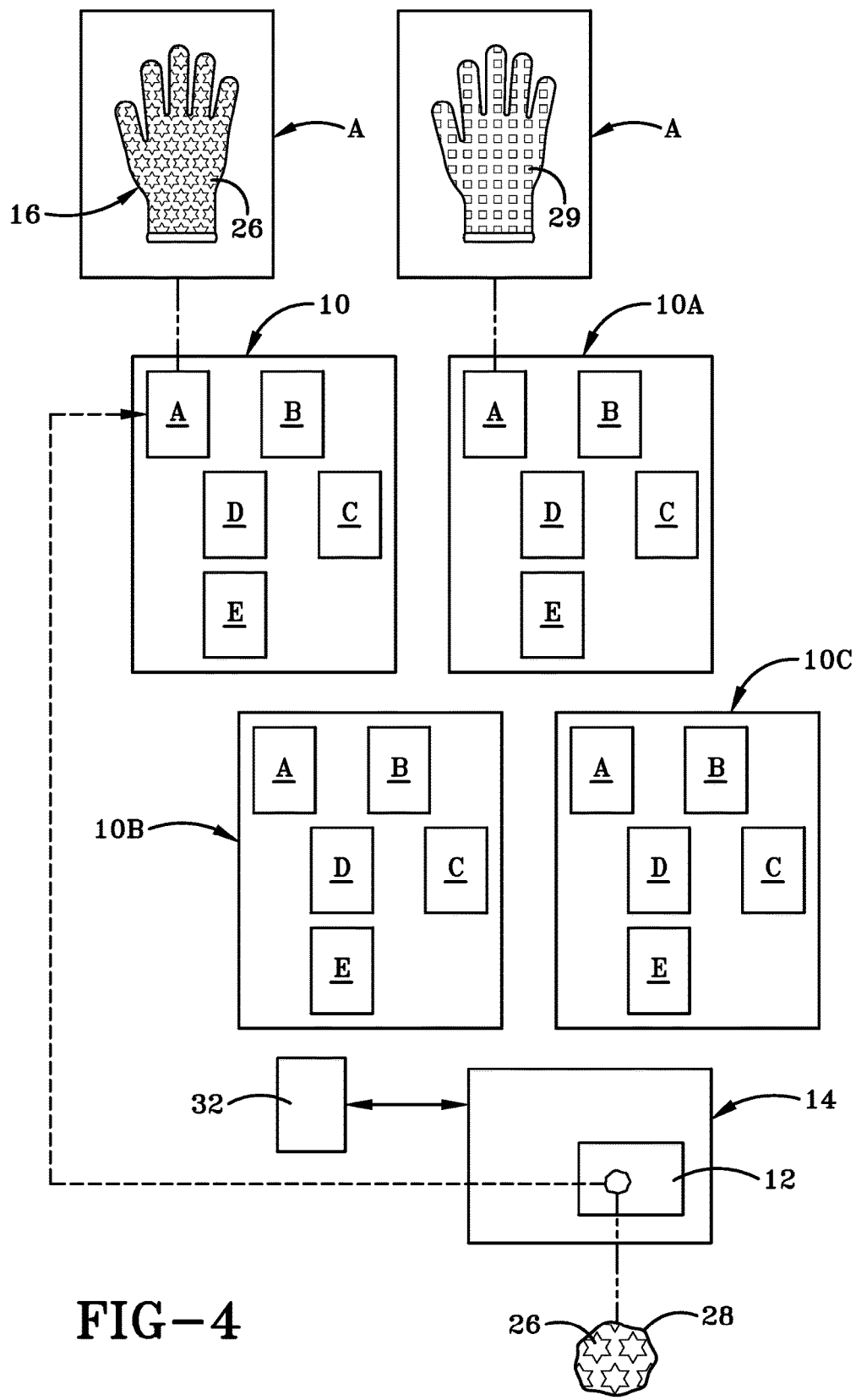
FIG. 4 is a diagrammatic view of the tracking and identification of the origin plant and processing area therein of the damaged glove utilizing one aspect of the present invention.

One aspect of utilizing the method of the present invention is illustrated in FIG. 4. This figures shows, in diagrammatic form, four plants 10, 10A, 10B and 10C which each process a foodstuff that becomes product 12. Product 12 is manufactured in each of plants 10, 10A, 10B and 10C in substantially the same manner (illustrated in FIG. 1) and is shipped from each plant to destination location 14. In each of the plants 10-10C the management in that plant has assigned gloves of different colors to different areas or processes in that plant in the same manner as described above with reference to plant 10.

Figure 3:
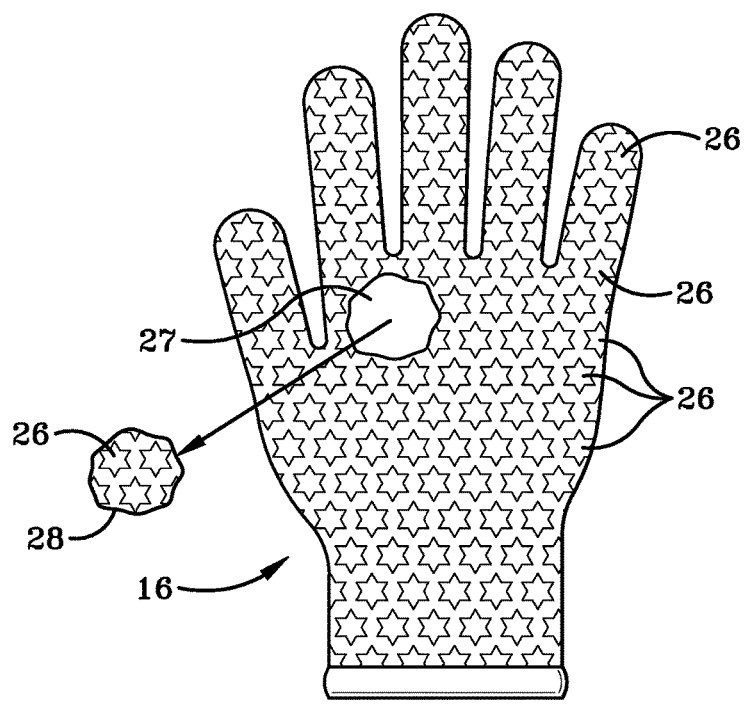
FIG. 3 is a diagrammatic view of an exemplary glove showing identifiers thereon and showing damage caused to the glove during processing.

Operations at the plants 10-10C proceed in the desired manner. FIG. 3 shows a glove 16 which has been damaged during a processing operation at one of plants 10-10C and piece 28 of that glove 16 has been torn off leaving a hole 27 therein. Piece 28 accidentally becomes incorporated into a product 12 and is shipped to destination location 14. The method of use includes the step of locating a piece of a glove, such as piece 28, in product 12 at any area of the plant in which the glove 16 was damaged or at the destination location 14. By way of example only, piece 28 is located in product 12 at the destination location 14. As a further step in the method of use of the present invention, the identifier 26 is utilized to identify which of the plants 10-10C the glove in question was used. Absent identifier 26, it would be difficult and time consuming for anyone to determine which of plants 10-10C processed product 12. It will be understood that the glove from which piece 28 originated can be identified if the colors of gloves assigned in each of the areas of each of the plants 10-10C is unique. In this instance only color is utilized to identify the specific plant in which glove 16 is used.

However, in instances where the colors of the gloves used in particular areas or steps of a process across all of the plants 10-10C are similar or identical, then the step of utilizing the unique identifier 26 to identify which one of plants 10-10C the piece 28 of glove originated from is important. In the example shown in FIG. 4 piece 28 of glove 16 includes unique identifier 26, management at location 14 is able to utilize identifier 26 to identify which of the plants 10-10C processed product 12. This is accomplished by comparing identifier 26 on piece 28 with a list or registry of identifiers, represented by box 32 in FIG. 4. List or registry 32 is a compilation of all of the identifiers used by a plurality of processing plants which process the same foodstuff. It will be understood that registry 32 it may, for example, be an online list or registry, a physical record of identifiers provided to management at destination location 14, or a centralized list or registry maintained by an association or body which regulates that food industry. Any suitable format or delivery of list 32 is contemplated.

By way of example, identifier 26 on piece 28 is able to be matched with plant 10 in FIG. 4 by comparing identifier 26 with all other identifiers on list 32. Management at destination location 14 then notifies management at plant 10 that a piece 28 of a glove has been located in product 12. They are also able to indicate to management at plant 10 the color of the glove from which piece 28 was torn. In the example situation, piece 28 is blue and, armed with that information, management at plant 10 is able to determine that the damaged glove came from area A in their plant 10 because all blue gloves are used in that area A. They are then able to examine Area A and implement corrective strategies to try and prevent future pieces of gloves 16 used in area A from being inadvertently incorporated into future processed products. Thus, being able to identify the exact area in which the glove was damaged enables management at plant 10 to follow the method of the present invention by changing plant operations to prevent further glove failure.

Thus, in one aspect of the invention, there is disclosed a method of identifying an area or processing operation (A-E) utilized in a plant 10 from which a damaged glove originated, said method comprising the steps of providing a plurality of differently colored sets of gloves 16-24; assigning a different one of the colored sets of gloves 16-24 to each of a plurality of different areas in the plant 10; causing workers in a first area or first processing operation (Area A) in the plant to wear gloves of a first color 16; and causing workers in a second area or second processing operation (Area B) in the plant to wear gloves of a second color 18 and then utilizing the color of a piece 28 of glove located in a product to determine in which of the first and second areas or processing operations the piece originated.

The method further includes locating a piece 28 of a glove in a product 12; noting a color of the piece 28 of glove located in the product 12; comparing the color of piece 28 of glove with the first and second colors 16, 18; matching the color of the piece 28 of glove with one or the other of the first and second colors 16, 18; and identifying a specific one of the first and second areas or first and second processing operations (Areas A and B) in which a glove was damaged by utilizing the matched color of the piece 28 with the one of the first and second glove colors 16, 18 and then utilizing the color of gloves 16, 18 to identify which area or processing step of plant 10 the damage to the glove occurred. Once the specific area or processing step is identified then the method further includes the step of changing plant operations to reduce the possibility of future glove failure. The step of changing plant operations may include examining the work environment to determine and then remove unnecessary hazardous articles or components that could potentially damage gloves, changing procedural steps to minimize contact with a product and thereby lower the possibility of damaging gloves, educating workers to work in a safer manner to minimize damage, increasing quality control to ensure damaged pieces of glove do not exit that area or step in the plant without being located, and instituting improved examination of products exiting an area or processing step including adding employees or technology that will assist in locating damaged pieces of glove. It will be understood that any manner of changing plant operations to minimize the potential for damaging gloves in that plant in the future is contemplated to fall within the scope of this step.

The disclosed method may be instituted in plants where the gloves of the first and second color 16, 18 are used to handle foodstuffs, most particularly raw foodstuffs such as meat, most specifically poultry. During the processing, the workers will handle the foodstuff by performing the first processing operation (A) on the foodstuff, such as raw meat, with the gloves of the first color 16; and performing the second processing operation (B) on the foodstuff (such as raw meat) with gloves of the second color. Thus, the method assists in determining if a particular piece of glove was used in the first processing operation (A) or the second processing operation (B).

In accordance with another aspect, the invention may further comprise the step of providing a unique identifier 26 on each of the gloves of the first and second colors 16, 18 used in plant 10. Preferably or ideally, the same identifier 26 is provided on all the gloves of the first and second colors 16, 18 used in that plant 10.

In accordance with another aspect, the invention may include a method of identifying a processing plant from which a damaged piece 28 of glove originated. The method includes the steps of marking gloves 16-24 originating in a first processing plant 10 with a first identifier 26; and marking gloves originating in a second processing plant 10A with a second identifier 29 (FIG. 4); and providing a list 32 of matching identifiers 26, 29 and processing plants 10, 10A to merchants 14; where the list 32 includes the first and second identifiers 26, 29 matched with the first and second processing plants 10, 10A, respectively.

The method further includes the steps of locating a piece 28 of a glove in a product 12, locating an identifier on the damaged piece 28 of glove; identifying the identifier as one of the first and second identifiers 26, 29; reviewing the list 32; and matching the identified one of the first and second identifiers 26, 29 with the respective one of the first and second processing plants 10, 10A; and contacting the matched one of the first and second processing plants 10, 10A to report the locating of the damaged piece 28 of glove.

The method further includes marking the gloves originating in the first plant 10 includes marking a first set of gloves of a first color 16 with the first identifier 26; and marking a second set of gloves of a second color 18 with the same first identifier 26. The method further comprises the steps of using the first set of first colored gloves 16 in a first area or first processing step (Area A) in the first processing plant 10 and using the second set of second colored gloves 18 in a second area or second processing step (Area B) in the first processing plant.

The method further includes marking all the gloves originating in the second processing plant 10A with the same second identifier 29. Thus, the method further includes the steps of a first set of first colored gloves with the second identifier 29 in a first area or first processing step (Area A) in the second processing plant 10A and using a second set of second colored gloves with the second identifier 29 in a second area or second processing step (Area B) in the second processing plant 10A.

The method further comprises the steps of notifying the matched one of the first and second plants 10, for example, of a color of the damaged piece 28 of glove; and comparing the color of the damaged piece 28 of glove with one of the first color and second color 16, 18 to identify the one of the first and second areas or first and second processes (Areas A or B) in which the glove was worn. It will be understood the method further includes utilizing additional sets of differently colored gloves (20-24) other than the first and second colors (16-18) for additional areas or processes (C-E) within the plant 10. This methodology is particularly useful in a food processing plant, especially one that processes raw foodstuffs, such as raw meat, particularly poultry.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the aspects of the invention are an example and the invention is not limited to the exact details shown or described.

The invention claimed is:

1. An identification system comprising:
a first set of gloves used in a first area of a first processing plant or in a first processing operation in a first part of a production of an end product, wherein each glove of the first set of gloves is provided with a first identifier;
a second set of gloves used in a second area of the first processing plant or in a second processing plant or in a second processing operation in a second part of the production of the end product; wherein each glove of the second set of gloves is provided with a second identifier; and
wherein the first identifier and the second identifier are one or more of a color, a name, a trademark, a number, a symbol, a chemical signature, an electronic signature, a digital signature, a texture applied to an exterior surface of a glove, or a presence of flocking on an interior surface of a glove; and wherein the first identifier is different from the second identifier; wherein the first set of gloves and the second set of gloves are substantially identical except for the first identifier provided on gloves of the first set of gloves and the second identifier provided on gloves of the second set of gloves; and matching an identifier on a piece of damaged glove that is located in the end product with the first identifier or the second identifier to identify where in the first area or in the second area; or in the first processing plant or in the second processing plant; or in the first processing operation or in the second processing operation, the piece of damaged glove originated.

2. The system as identified in claim 1, further comprising:
a third set of gloves used in a third area of the first processing plant or in a third processing plant, or in a third processing operation in a third part of the production of the end product; wherein the third set of gloves is provided with a third identifier; and wherein the third identifier is one or more of a color, a name, a trademark, a number, a symbol, a chemical signature, an electronic signature, a digital signature, a texture applied to an exterior surface of a glove, or a presence of flocking on an interior surface of a glove; and wherein the third identifier is different from each of the first identifier and the second identifier.

3. The system as defined in claim 1, wherein each of the first identifier and the second identifier is a color approved for use in food processing by the United States Food and Drug Administration (FDA).

4. The system as defined in claim 1, wherein the first set of gloves and the second set of gloves are fabricated from latex or nitrile, or any other material approved for use in food processing by the United States Food and Drug Administration (FDA).

5. The system as defined in claim 4, further comprising a list or registry of identifiers used in a plurality of different plants that process a same foodstuff, wherein the list or registry includes the first identifier and the second identifier and a plurality of additional identifiers.

6. An identification method comprising the steps of:
providing a first set of gloves having a first identifier thereon;
providing a second set of gloves having a second identifier thereon, wherein the first set of gloves and the second set of gloves are substantially identical except for the first identifier and the second identifier;
assigning the first set of gloves to workers in a first production area or in a first processing operation or in a first processing plant;
assigning the second set of gloves to workers in a second production area or in a second processing operation or in a second processing plant; wherein the first and second production areas, or the first and second processing operations, or the first and second processing plants are involved in producing a common end product;
causing workers in the first production area or the first processing operation or in the first processing plant to wear gloves from the first set of gloves that include the first identifier;
causing workers in the second production area or the second processing operation or in the second processing plant to wear gloves from the second set of gloves that include the second identifier; and
wherein the first identifier and the second identifier are one or more of a color, a name, a trademark, a number, a symbol, a chemical signature, an electronic signature, a digital signature, a texture applied to an exterior surface of a glove, or a presence of flocking on an interior surface of a glove; and wherein the first identifier is different from the second identifier; and
matching an identifier on a piece of damaged glove that is located in the end product with the first identifier or the second identifier to identify where in the first and second production areas or in the first and second processing operations or in the first and second processing plants the piece of damaged glove originated.

7. A method of identifying a processing plant from which a damaged piece of glove originated, said method comprising the steps of:
selecting a plurality of gloves that are substantially identical;
marking a first identifier on a first set of gloves from the plurality of gloves;

sending the first set of gloves to a first processing plant;
marking a second identifier on a second set of gloves from the plurality of gloves, wherein the second identifier is different from the first identifier;
sending the second set of gloves to a second processing plant;
wherein the steps of marking of each of the first identifier and the second identifier comprises marking one or more of a color, a name, a trademark, a number, a symbol, a chemical signature, an electronic signature, a digital signature, a texture applied to an exterior surface of a glove, or a presence of flocking provided on an interior surface of a glove; and
matching an identifier on a piece of damaged glove that is located in the end product with the first identifier or the second identifier to identify from which of the first and second processing plants the piece of damaged glove originated.

8. The method as defined in claim 7, further comprising:
providing a list of matching identifiers and processing plants to merchants; where the list includes the first identifier and the second identifier matched with the first processing plant and the second processing plant.

9. The method as defined in claim 8, further comprising the steps of:
locating the identifier on the damaged piece of glove;
identifying the identifier as one of the first identifier or the second identifier;
reviewing the list; and
matching the identified one of the first identifier and the second identifier with the respective one of the first processing plant and the second processing plant; and
contacting the matched one of the first processing plant and the second processing plant to report the locating of the damaged piece of glove.

10. The method as defined in claim 9, where the step of marking the gloves originating in the first plant includes marking a first set of gloves of a first color with the first identifier; and marking a second set of gloves of a second color with the same first identifier.

11. The method as defined in claim 10, further comprising the steps of:
using the first set of gloves of the first color in a first area or first processing step in the first processing plant; and
using the second set of gloves of the second color in a second area or second processing step in the first processing plant.

12. The method as defined in claim 11, where the step of marking the gloves originating in the second processing plant includes marking a first set of gloves of a first color with the second identifier and marking a second set of gloves of a second color with the second identifier.

13. The method as defined in claim 12, further comprising the steps of:
using the first set of first colored gloves with the second identifier in a first area or first processing step in the second processing plant; and
using the second set of second colored gloves with the second identifier in a second area or second processing step in the second processing plant.

14. The method as defined in claim 13, further comprising the steps of:
notifying the matched one of the first plant and the second plant of a color of the damaged piece of glove; and
comparing the color of the damaged piece of glove with one of the first color and the second color to identify the one of the first area and the second area or the first process and the second process in which the glove was worn.

15. The method as defined in claim 14, further comprising the step of:
utilizing additional sets of differently colored gloves other than the first color and the second color for additional areas or process within the plant and marking the additional sets of differently colored gloves with the same identifier as the first color gloves and the second color gloves.

16. The method as defined in claim 15, wherein the step of using the first colored set of gloves and the second colored sets of gloves occurs in a food processing plant, a meat processing plant or a poultry processing plant.

17. The method as defined in claim 14, further comprising the step of changing plant operations to prevent further glove failure in an area or processing step in which the piece of glove found in an end product originated.

18. The method as defined in claim 7, wherein the step of providing the plurality of different sets of gloves includes providing a plurality of sets of gloves that differ only in regards to the first identifier and second identifier provided on each glove of the different sets of gloves.

* * * * *